United States Patent [19]

Peasley

[11] 3,902,641
[45] Sept. 2, 1975

[54] APPARATUS FOR ATTACHING CARGO TO A VEHICLE BODY

[76] Inventor: Curtiss M. Peasley, 25 Boulder Dr., Burlington, Mass. 01803

[22] Filed: June 18, 1973

[21] Appl. No.: 370,935

[52] U.S. Cl............................ 224/42.1 B; 224/42.1 B
[51] Int. Cl.² ..................................... B60R 11/00
[58] Field of Search...... 224/42.1 F, 42.1 B, 42.1 R, 224/29 R

[56] References Cited
UNITED STATES PATENTS
3,366,296   1/1968   Feinstein et al. ............. 224/42.1 G
3,721,374   3/1973   Eby ................................ 224/42.1 B FOREIGN PATENTS OR APPLICATIONS
1,228,920   3/1960   France ........................... 224/42.1 B
681,156     3/1964   Canada........................... 224/42.1 G
258,741     3/1967   Austria .......................... 224/42.1 G Primary Examiner—Robert J. Spar
Assistant Examiner—Jerold M. Forsberg
Attorney, Agent, or Firm—Thompson, Birch, Gauthier & Samuels

[57] ABSTRACT

An improved apparatus is disclosed for attaching cargo to a vehicle body, for example the roof of a passenger car. The apparatus includes a flexible elongated load bearing element which is adapted to lie against the vehicle body and which is provided with a channel having seated therein a flexible elongated tensioning element. The ends of the tensioning element, which extend beyond the ends of the load bearing element, are provided with clamps or the like for removably securing the tensioning element to the vehicle body. The tensioning element is suitably adapted to be tightened and thereafter maintained in a taut condition.

4 Claims, 5 Drawing Figures

PATENTED SEP 2 1975 3,902,641

3,902,641

APPARATUS FOR ATTACHING CARGO TO A VEHICLE BODY

BACKGROUND OF THE INVENTION a. Field of the Invention

This invention relates generally to cargo securing devices, and is concerned in particular with a novel and improved apparatus for attaching cargo to a vehicle body, for example the roof of a passenger car.

b. The Prior Art

A number of prior art devices have been developed in the past in an attempt at providing a suitable means for attaching cargo to a vehicle body. Certain of these prior art devices, for example those shown in U.S. Pat. Nos. 2,574,018 (Cotton), 2,639,848 (Burmeister) and 2,641,396 (Parr) include rigid frame members which are not easily adaptable to different sized vehicles, which detract from the appearance of the vehicle when in use and which are difficult if not impossible to store in a vehicle trunk when not in use. Other prior art devices, for example those shown in U.S. Pat. Nos. 1,798,872 (Ellis) and 2,983,413 (Verwers) rely primarily on flexible tensioning elements to secure cargo to the vehicle body. These devices are, however, also unsatisfactory because the cargo is in direct contact with the tensioning elements, thereby risking damage thereto as by cutting or chafing. Also, such devices do not maintain an adequate spaced relationship between the cargo and the vehicle body, with the result that the vehicle surface is frequently scratched or dented by the cargo.

SUMMARY OF THE INVENTION

It is a general object of the present invention to provide an improved apparatus for attaching cargo to a vehicle body which obviates all of the above-noted problems and disadvantages. A more specific object of the present invention is to provide a cargo securing device which is made up primarily of flexible components, the lengths of which may be easily adapted to suit a wide range of vehicle sizes. Another object of the present invention is the provision of an apparatus for attaching cargo to a vehicle, which apparatus may be rapidly and conveniently installed, which does not detract from the overall appearance of the vehicle when in use, and which may be easily removed and folded into a compact package for storage in a vehicle trunk when not in use. Another object of the present invention is the provision of a cargo securing device having flexible tensioning elements which are protected from abrasion by either the cargo on the vehicle body through the use of flexible load bearing elements, the latter also serving as a means for maintaining an adequate spaced relationship between the cargo and the vehicle body.

DESCRIPTION OF THE PREFERRED EMBODIMENT

Figure 1:
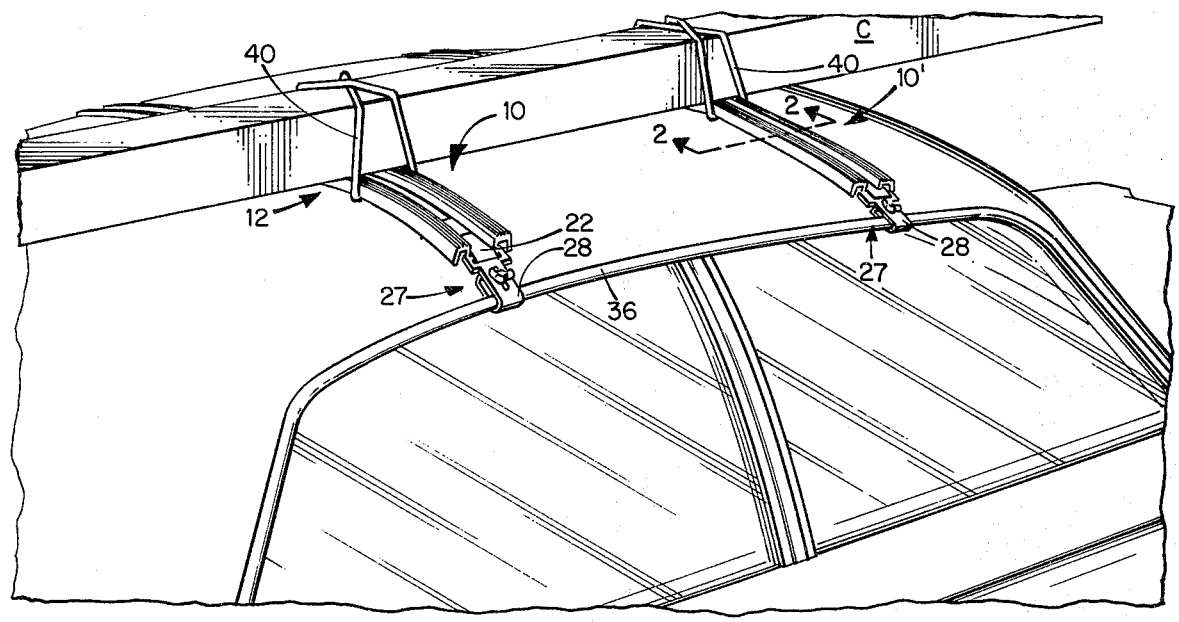
FIG. 1 is a view in perspective showing a preferred embodiment of the present invention in use on the roof of a passenger vehicle.

Referring now to the drawings, wherein like numbers designate like parts throughout the several views, there is shown at 10 a cargo securing device embodying the concepts of the present invention. Such devices are normally employed in pairs, and hence another identical device is shown in FIG. 1 at 10'.

The cargo securing device 10 (and its identical mate 10') includes an elongated flexible load bearing element 12, which may if desired conveniently comprise a plastic extrusion. The load bearing element has a centrally located substantially flat bottom member 14 and upstanding side members 16a and 16b. Each side member preferably includes inner and outer laterally spaced legs 18a and 18b connected by an intermediate top surface 20.

An elongated flexible tensioning element 22 is located on the bottom member 14 between the side members 16a and 16b. The inner legs 18a of the side members are grooved as at 24 adjacent to the bottom member 14 to accept the edges of the tensioning element, thereby establishing an interlocking relationship which precludes accidental dislocation of the tensioning element 22 from the load bearing element 12. The top surfaces 20 are preferably longitudinally serrated as indicated typically at 26 to provide an improved gripping effect on the cargo "C" mounted thereon.

Figures 2, 3:
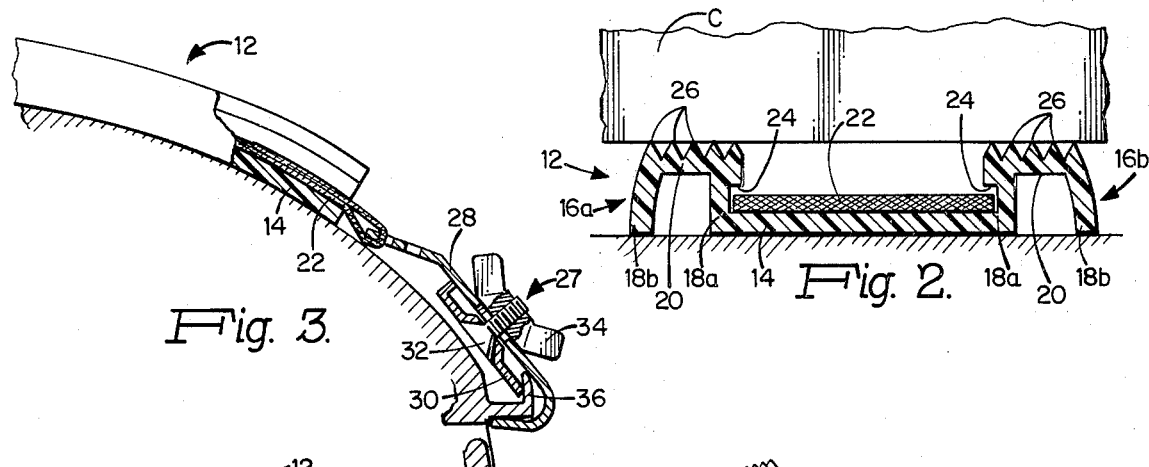
FIG. 2 is a sectional view on an enlarged scale taken along lines 2—2 of FIG. 1.
FIG. 3 is a view in side elevation on an enlarged scale with portions broken away showing the means for attaching the tensioning elements to the vehicle body.
Figure 4:
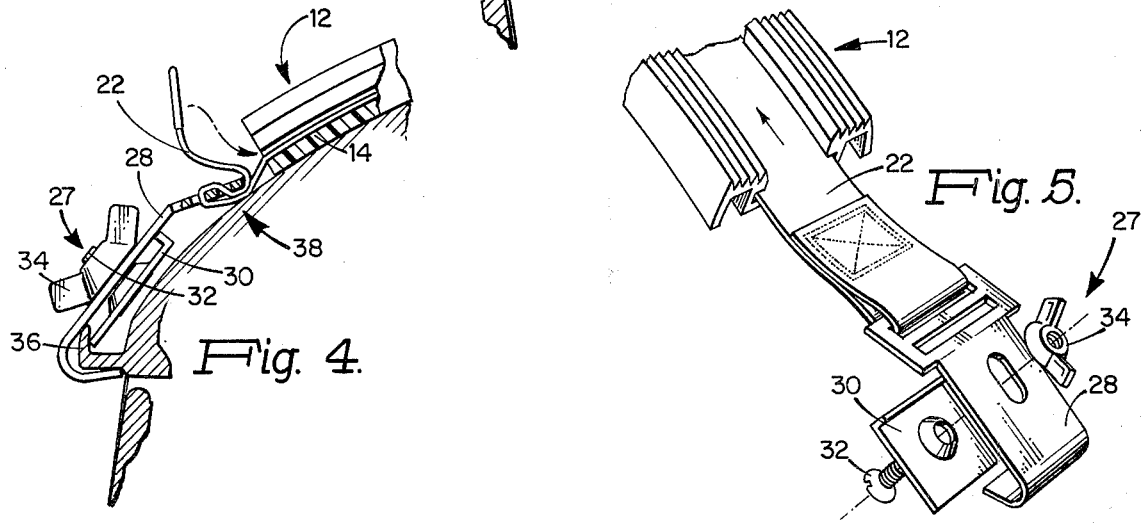
FIG. 4 is a view similar to FIG. 3, showing the opposite end of the tensioning element and the means for tightening the same; and, FIG. 5 is a view in perspective, partially exploded, of the components shown in FIG. 3.
Figure 5:
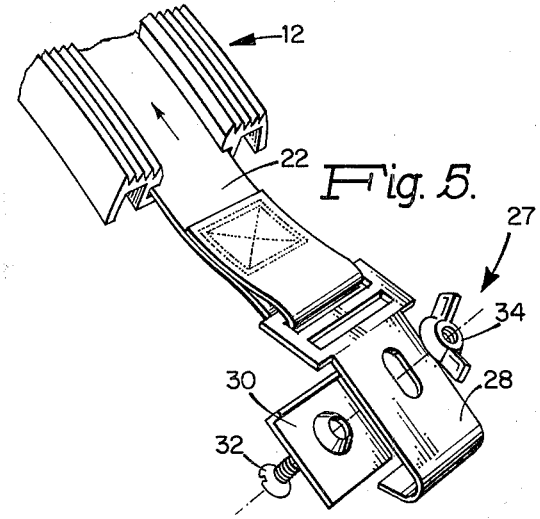

As is best shown in FIGS. 3 and 4, the ends of the tensioning element 22 extend beyond the ends of the load bearing element 12. Attachment assemblies 27, including hook members 28 are connected to the ends of the tensioning element. Each hook member cooperates with a clamp member 30, a bolt 32 and a wing nut 34 to provide a means of attachment to the vehicle body, as herein shown for example to the gutter 26 which normally extends along the edges of a passenger vehicle roof. The tensioning element 22 is adjustable by means of a buckle arrangement indicated generally at 38.

When mounting the apparatus of the present invention, the attachment assemblies 27 are first employed to attach the ends of the tensioning elements 22 to the vehicle body, conveniently the roof of a passenger car. Thereafter, the buckle arrangements 38 are adjusted to place the tensioning elements 22 in tension. Once this has been accomplished, cargo such as that shown in FIGS. 1 and 2 at C may be deposited on the serrated surfaces 26 of the load bearing element 12, and held thereon by ropes, straps or the like indicated at 40.

Having thus described a preferred embodiment of the invention, its advantageous features will now be more readily appreciated by those skilled in the art. Among these advantages is the convenient manner in which the apparatus 10 may be rolled up or folded into a neat compact package for storage. This is made possible by the flexibility of the principal components, namely the load bearing elements 12 and the tensioning elements 22. The apparatus may be conveniently adapted to a wide range of vehicle sizes, including small compact cars, by simply trimming each load bearing element 12 to an appropriate length. The tensioning element 22 is protected by the load bearing element 12 from being cut or abraded by either the vehicle body or the cargo C. This is most apparent from FIG. 2 wherein it can be seen that the tensioning element 22 is protected from beneath by the bottom member 14, and recessed beneath the serrated upper surfaces of the side members 16a and 16b. The serrations 26 provide an improved gripping action which inhibits any tendency for the cargo C to shift forwardly or rearwardly when the vehicle stops or starts. The thickness of the load bearing element 12, which is governed by the height of the legs 16a and 16b, is sufficient to insure that the cargo C is spaced above the vehicle roof. The load bearing element 12 may be conveniently and inexpensively extruded from plastic or the like.

It is my intention to cover all changes and modifications to the embodiment herein chosen for purposes of disclosure which do not depart from the spirit and scope of the claims appended hereto.

I claim:

1. Apparatus for attaching cargo to a vehicle body, comprising in combination: a flexible elongated load bearing element having a substantially flat centrally located bottom member adapted to lie against the vehicle body and upstanding side members which cooperate with said bottom member to define an open channel, said side members having shoulders which are spaced vertically from and which overlie the edges of said bottom member, a substantially flat flexible elongated tensioning element seated in and extending along the entire length of said channel, with the edges of said tensioning element extending laterally beneath said shoulders, the thickness of said tensioning element being less than the depth of said channel, with the upper surfaces of said side members being adapted to engage and support the cargo at a level spaced vertically above the tensioning element seated in said channel, the ends of said tensioning element extending beyond the ends of said load bearing element and having associated therewith means for attaching said tensioning element to the vehicle body, and means located beyond one end of said load bearing element for tightening said tensioning element.

2. The apparatus as claimed in claim 1 wherein said side members are each provided with a generally inverted U-shaped crss-section made up of inner and outer laterally spaced legs interconnected by an intermediate top surface.

3. The apparatus as claimed in claim 1 wherein the top surfaces of said side members are longitudinally serrated, thereby providing gripping surfaces for the cargo positioned thereon.

4. The apparatus as claimed in claim 2 wherein said top surfaces are longitudinally serrated to provide gripping surfaces for the cargo positioned thereon.

* * * * *